United States Patent [19]

Manduley

[11] Patent Number: 4,628,457
[45] Date of Patent: Dec. 9, 1986

[54] POSTAL RATE MEMORY MODULE WITH INTEGRAL BATTERY POWER

[75] Inventor: Flavio M. Manduley, Woodbury, Conn.

[73] Assignee: Pitney Bowes Inc., Stamford, Conn.

[21] Appl. No.: 590,670

[22] Filed: Mar. 19, 1984

[51] Int. Cl.[4] .......................... G06F 15/21; G06F 9/06
[52] U.S. Cl. .................................... 364/464; 365/226; 365/229
[58] Field of Search ....................... 364/464, 466, 900; 365/226, 229

[56] References Cited

U.S. PATENT DOCUMENTS

| | | | |
|---|---|---|---|
| 3,635,297 | 1/1972 | Salava | 364/464 X |
| 3,920,979 | 11/1975 | Kilby et al. | 364/705 |
| 4,064,954 | 12/1977 | Rock | 364/464 X |
| 4,084,242 | 4/1978 | Conti | 364/466 |
| 4,143,417 | 3/1979 | Wald et al. | 364/900 |
| 4,286,325 | 8/1981 | Dlugos et al. | 364/900 X |
| 4,320,461 | 3/1982 | Dlugos | 364/900 X |
| 4,326,254 | 4/1982 | Uchimura et al. | 364/464 X |
| 4,430,716 | 2/1984 | Dlugos et al. | 364/466 |
| 4,506,330 | 3/1985 | Dlugos | 364/466 |
| 4,539,660 | 9/1985 | Miyauchi et al. | 365/229 |

Primary Examiner—Felix D. Gruber
Assistant Examiner—Edward R. Cosimono
Attorney, Agent, or Firm—Robert H. Whisker; David E. Pitchenik; William D. Soltow, Jr.

[57] ABSTRACT

A postal rate memory module is disclosed. The module includes a memory which stores current postal data and an integral battery. The module may be used in a postal scale which includes a scale for determining the weight of an item to be mailed, a memory module for storing postal rate information, a data entry apparatus for entering postal information relating to the item and a processor operatively connected to; the scale, the postal rate memory module and the data entry apparatus, for determining the appropriate postage for the item in accordance with the weight, the entered postal information and the postal rate information. The battery has sufficient capacity to provide at least a significant portion of the power supply and is automatically replaced each time the memory module is replaced with a module containing updated postal rate information so that the user is not burdened with the need to stock and replace batteries.

17 Claims, 6 Drawing Figures

POSTAL RATE MEMORY MODULE WITH INTEGRAL BATTERY POWER

BACKGROUND OF THE INVENTION

This invention relates to postal scales and more particularly to battery powered postal scales.

Postal scales which determine the weight of an item to be mailed and compute the appropriate postage for that item in accordance with the weight and other postal information, such as destination and class of service, are well known in the art. One such postal scale system is taught in U.S. Pat. No. 4,286,325 to Dlugos, et al., for *System and Method for Computing Domestic and International Postage;* which is hereby incorporated by reference. Such scales are typically powered by an electronic power supply dispite the fact that, at least for smaller stand alone systems which do not incorporate a postage meter or printer or other peripherals which consume large amounts of power, the power needed might be more economically supplied from batteries. Users of small, stand alone postal scales and other such business equipment have been willing to pay the cost differential for electronic power supplies to avoid the problems and inconvenience associated with stocking and replacing or recharging batteries, and to avoid the possibility erroneous operation as the batteries run down. These problems are so burdensome to users that batteries are generally not used as main power sources except in equipment where portability or continued operation in the event of power interruption are necessary.

Another aspect of postal scales is that postage for an item to be mailed is computed in accordance with postal rate information provided by the United States Postal Service and/or the Postal Services of various other countries. The most economical way for this postal information to be incorporated into a small, stand alone postal scale, prior to this invention, has been through the use of programmable read only memories (PROM's). PROM's provide non-volatile data storage and are relatively easy for a postal scale vendor to program with new information such as postal rate change.

Such rates change too frequently and the postal scale market is too small for read only memories (ROM's), where data is incorporated into the ROM at the time of manufacture, to be economically feasible, and random access memories (RAM's) do not provide non-volatile storage unless a back-up power supply is provided. While RAM's with integral back-up power are available their additional costs and complexity are such that they also are not considered economically feasible for use in postal scales.

Because of the constraints discussed above the general practice in the postal scale industry is for the scale vendor to monitor changes in postal rates and when rates change program new PROM's with the new rates and send the new PROM's to the scale user for installation.

Because of the limitations on the amount of memory space available in a single PROM package, and the complexity of the various postal rate charts a full set of postal rate information might require 12 or more PROM packages. To provide for these PROM's each prior art scale required an electronic power supply capable of supplying the power needed by the full set of PROM's and their associated circuitry, whether or not the scale actually used the maximum number of PROM's. Further, because of memory limitations, complex and sophisticated programming techniques were necessary to reduce the postal rate data to a form which could be stored in a reasonable number of PROM packages. The complexity of the techniques used may be appreciated from consideration of those disclosed in U.S. Pat. No. 4,320,461, to Dlugos, for, *Postage Value Calculator With Expanded Memory Versatility.*

Thus, it is an object of the subject invention to provide a low cost postal scale.

More particularly, it is an object of the subject invention to provide a postal scale wherein the electronic power supply may be eliminated or, at least, substantially reduced in size so as to reduce the cost of the postal scale.

It is a further object of the subject invention to so reduce or eliminate power supply requirements without burdening the user with the need to monitor or maintain batteries.

It is still a further object of the subject invention to provide a postal scale wherein volatile memory may be used without increasing the total cost of the scale to provide back-up power for the memories.

It is still a further object of the subject invention to provide a postal rate memory having increased storage capacity and ease of programming.

BRIEF SUMMARY OF THE INVENTION

In considering the above objects applicants recognized a fact that had previously been unappreciated by those skilled in the postal scale art. Because of the particular applications intended for postage scales the novel combination, in a single module, of a postage rate memory and a battery with sufficient capacity to provide a substantial portion of the scale's power requirements would advantageously achieve the objects discussed above. (By "substantial portion of the scales power requirements" herein is meant at least sufficient capacity to drive the memory during its read and write cycles until such time as the module would be replaced). Because the battery would provide at least a substantial portion of the required power the scale power supply can be eliminated or reduced in size. Because of the cost savings on the power supply it is economically feasible to provide battery powered memory modules without increasing costs to the user. Because battery power is incorporated in the module volatile RAM's may be substituted for non-volatile PROM's; allowing more memory storage space for postal rate information and substantially reducing program complexity. Finally, because the postal scale vendor supplies updated postal rate information incorporated in new modules periodically all this may be achieved without burdening the user with the task of monitoring or maintaining batteries.

The above objects are achieved and the disadvantages of the prior art are overcome in the subject invention by means of a postal scale comprising; a scale for determining the weight of an item to be mailed, a data entry apparatus for entering postal information relating to the item, a memory module for storing postal rate information and a processor operatively connected to, the scale, the data entry apparatus and the memory module, to compute appropriate postage for the item in accordance with the weight, the entered postal information relating to the item and the postal rate information. The memory module further comprises, a postal rate memory storing the postal rate information, a battery having sufficient capacity to provide at least a substantial portion of the power requirements of the scale until the memory module is replaced with an updated module, a connector connecting the battery to the postal rate memory to provide power to the memory and a second connector connecting the memory to the processor so that the processor may access the postal rate information.

The above described postal scale may be used in accordance with the method of the subject invention which comprises the steps of; providing a postal scale for weighing items to be mailed and for determining the appropriate postage for such items in accordance with the weight of the item and selected postal rate information, the scale including a battery powered memory module for storing the postal rate information and for providing at least a substantial portion of the power required by the scale, monitoring the postal rates of the United States Postal Service and/or the postal services of other countries and/or private delivery services for changes in the selected postal rate information, and, upon change in the selected postal rate information, replacing the battery powered memory module with a new, charged memory module storing updated postal rate information, and monitoring the time elapsed after the scale is provided or the memory module is replaced, and, if a predetermined time elapses, replacing the memory module with a charged memory module so that the battery in use does not run down. (As used hereinafter "postal rates" shall mean the rates of the U.S. Postal Service, foreign postal services, or private delivery services.)

DETAILED DESCRIPTION OF THE PREFERRED EMBODIMENTS OF THE INVENTION

Figure 1:
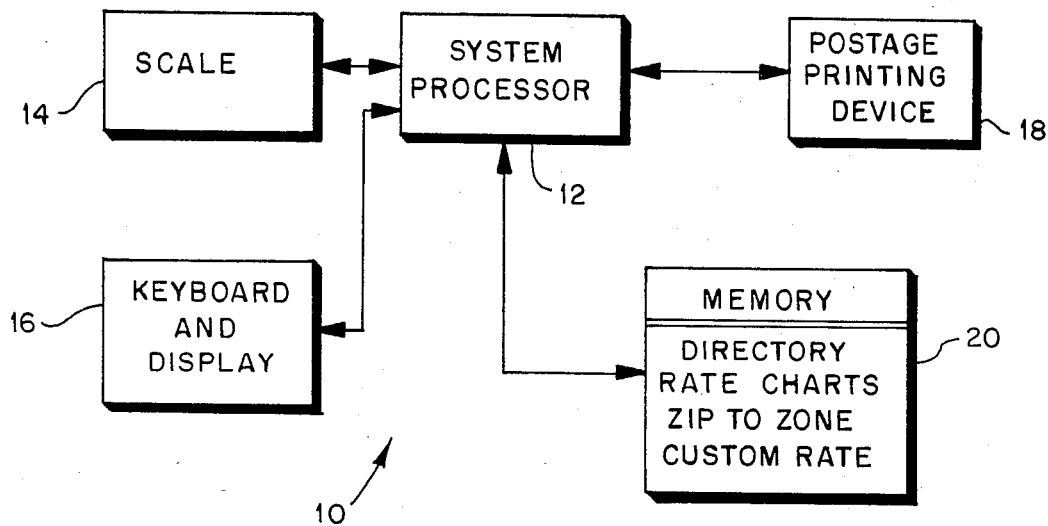
FIG. 1 is a schematic block diagram of a prior art postal scale.

FIG. 1 shows a schematic block diagram of a conventional postal scale 10. Scale 14, keyboard and display 16 and memory 20, which is typically a PROM, are operatively connected to system processor 12. Processor 12 receives weight information relating to an item to be mailed from scale 14 and other postal information, such as destination and class of service, relating to that item from keyboard and display 16 and accesses memory 20 to obtain postal rate information, such as rate charts, zip-to-zone conversions, and custom rates. The processor then uses this information to compute appropriate postage for the item to be mailed. Such computations are well known in the art and are described in more detail in the above incorporated U.S. patents and need not be discussed further here for an understanding of the invention. Processor 12 then outputs the postage computed to keyboard and display 16. alternatively, processor 12 may be interfaced to postage printing device 18 and such device may be set directly with the computed postage.

The prior art scale of FIG. 1 also includes electronic power supply (not shown) which provides power to scale 10.

Figure 2:
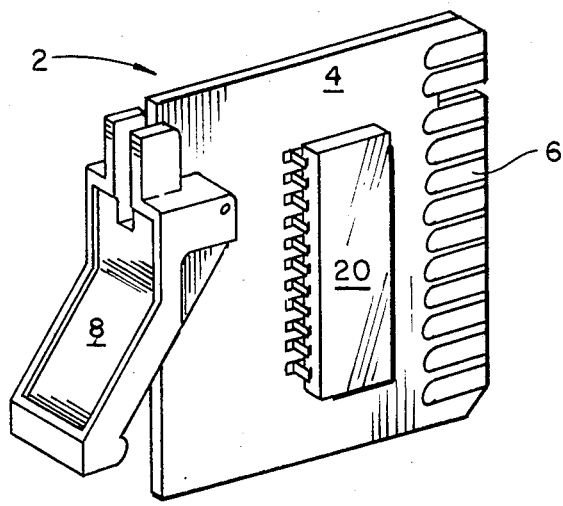
FIG. 2 is an isometric illustration of a prior art memory module.

FIG. 2 shows a prior art memory module 2 which would be used in conjunction with scale 10. Module 2 includes a printed circuit board 4, edge connector 6 and extractor handle 8. Memory 20 is mounted on printed circuit board 4 and appropriately connected to edge connector 6 so that when module 2 is mounted in scale 10 memory 20 is connected to scale 10 to transmit data and receive power. Of necessity then the power supply must be sized to provide power to the maximum number of PROM's 20 usuable with scale 10.

Figure 3:
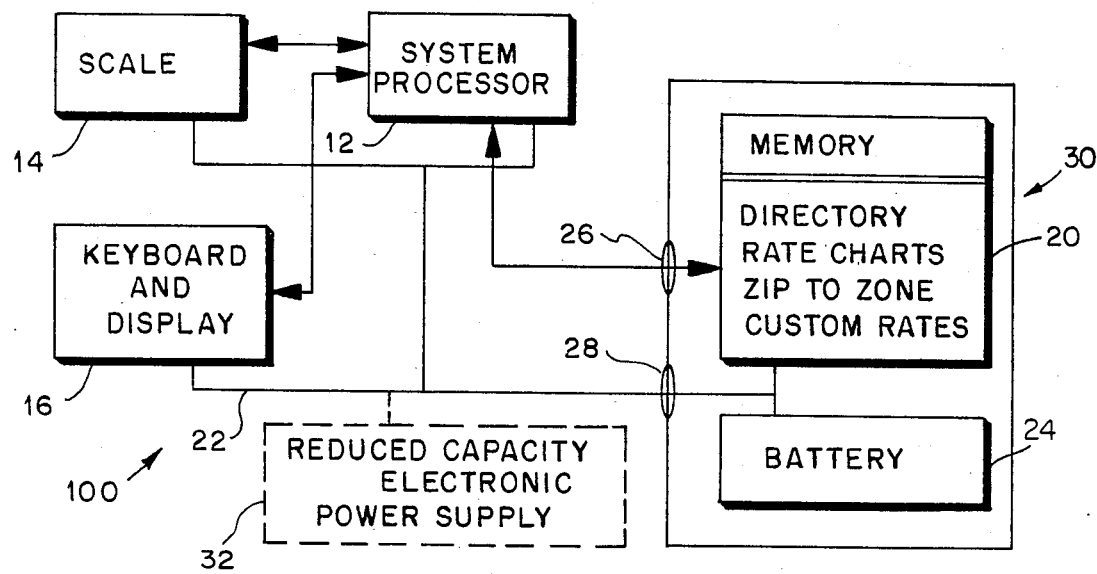
FIG. 3 is a schematic block diagram of a postal scale in accordance with the subject invention.

FIG. 3 shows postal scale 100 in accordance with the subject invention. Postal scale 100, in common with prior art postal scale 10, includes scale 14, keyboard and display 16 and system processor 12 operatively connected in a conventional manner. Postal scale 100 further includes memory module 30. Memory module 30 includes memory 20, which is identical to memory 20 or postal scale 10 and battery 24. Memory 20 is operatively connected to processor 12 through connector 26 in a conventional manner similar to that of postal scale 10. Battery 24 is operatively connected to memory 20 and to power distribution system 22 of postal scale 100 through connector 28. (Connectors 26 and 28 may be separate portions of a single edge connector as will be described below).

Battery 24 is sized to have sufficient capacity to provide at least the necessary power for read/write cycles of memory 20 until memory 20 is replaced. In accordance with the subject invention either battery 24 may have sufficient additional capacity to provide power to the remaining components of postal scale 100 or a reduced capacity electronic power supply 32 may be provided.

Figure 4A:
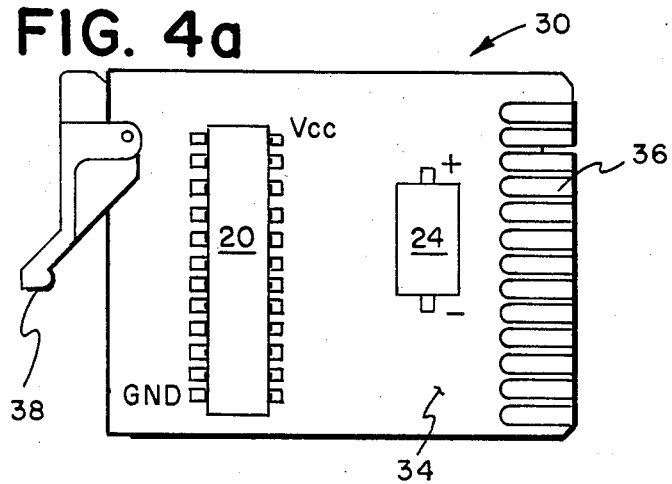
FIGS. 4a and 4b are front and back plan views, respectively, of memory modules in accordance with one embodiment of the subject invention.
Figure 4B:
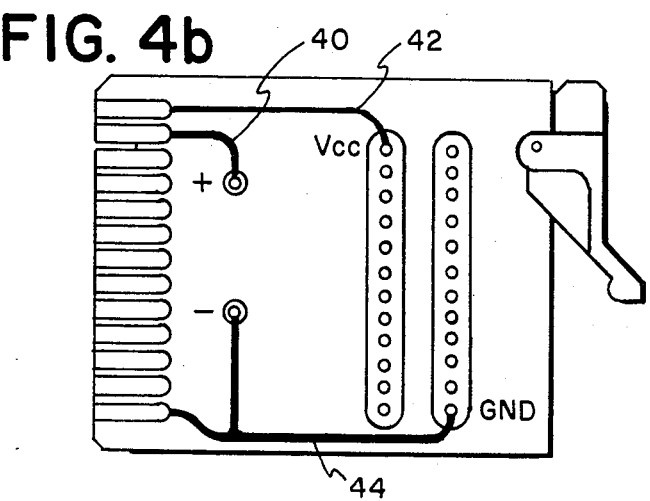

FIG. 4a shows a top plan view of memory module 30. Module 30 includes printed circuit board 34, edge connector 36, extractor 38 and memory 20. Additionally, battery 24 is mounted on printed circuit board 34. FIG. 4b shows a botton plan view of memory module 30. Conductor 40 connects the positive terminal of battery 24 to the Vcc line of postal scale 100 while conductor 42 returns Vcc to the Vcc connection of PROM 20. Conductor 44 connects the negative terminal of battery of 24, the ground of memory 20 and the ground of power distribution system 22 through edge connector 36. Those skilled in the art will recognize that memory module 30 is functionally identical to memory module 2, differing only in the possible need for an additional finger in edge connector 36 and the possible need for more area in printed circuit board 34 to allow for mounting and connecting battery 24. Thus, memory module 30 may be used in a postal scale with no functional changes in the scale. (connections between the data and control pin of memory 20 and the fingers of edge connector 36 have not been shown since they will vary with the particular geometry of printed circuit board 34 and the particular PROM used. Design of such connections is conventional and well known in the art and need not be discussed further here for an understanding of the subject invention).

The vendor of postal scale 100 would provide a scale with selected memory modules 30 which would provide the customer with the desired postal rate capabilities, all of which may not be desired by a particular customer. Postal scale 100 would appear identical to the customer except that, if battery 24 is sized with sufficient capacity, the customer would not need to worry if postal scale 100 were plugged in. In accordance with standard practice the vendor would monitor postal rate changes of the U.S. Postal Service and/or the postal services of other countries and automatically ship replacement modules to the customer when rate changes occurred. Additionally, the vendor would monitor the time since a module was delivered to the customer to insure that the module was replaced before the battery ran down even if no postal rate change occurred. This need provide no substantial additional burden on either the vendor or the customer since postal rate changes normally occur at least annually and batteries with sufficient capacity to provide power to PROM's 20 for a year's operation are readily available.

Figure 5:
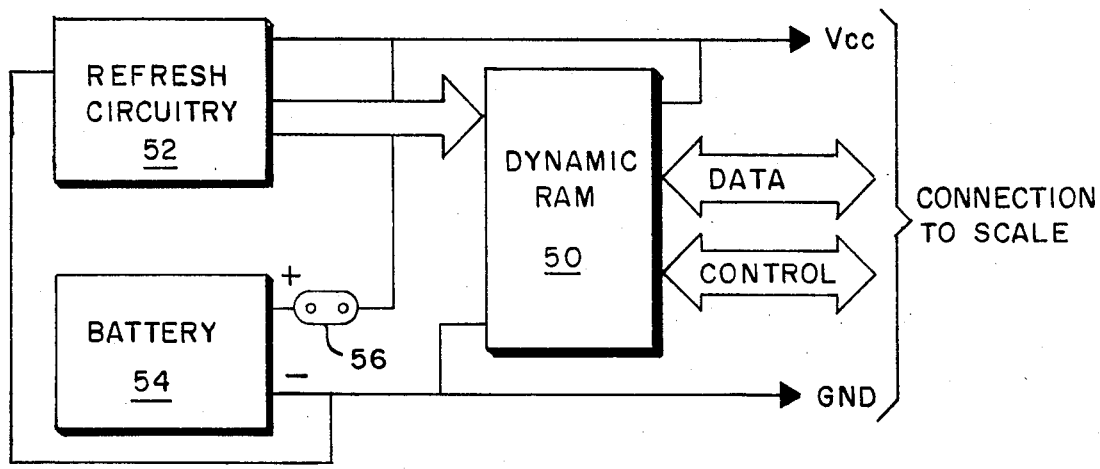
FIG. 5 is a schematic block diagram of a memory module in accordance with another embodiment of the subject invention.

FIG. 5 shows another embodiment of the subject invention wherein memory 20, is replaced by dynamic RAM 50. The circuitry in memory module 30 would, in this embodiment, include dynamic RAM 50, conventional refresh circuitry 52 and battery 54. RAM 50 would be programmed with postal rate information by the vendor directly from the vendor's data processing systems and shipped to the customer. Note that in this embodiment the somewhat cumbersome techniques needed to program PROM's are avoided. Since module 30 includes conventional refresh circuitry 52 and battery 54 the data in RAM 50 will be maintained during shipment. Note that in this embodiment Vcc is connected to RAM 50 within memory module 30 so that power is applied to RAM 50 and refresh circuitry 52 even though module 30 is not connected to postal scale 100. Connectable conductive link 56 is provided in the positive output of battery 54 so that the output may be disconnected while module 30 is stored prior to being loaded with postal rate information and shipped, so as to eliminate power drain on battery 24, then the connection is made when RAM 50 is loaded to preserve the postal rate information.

Dynamic RAM's and refresh circuitry for dynamic RAM's are well known in the art and the design of such a memory system as is shown in FIG. 5 would be well within the skill of a person of ordinary skill in the postal scale art and need not be discussed further here for an understanding of the subject invention.

Since dynamic RAM 50 is cheaper on a per bit basis than PROM 20 larger memory may be used. This would enable both the use of a smaller number of memory modules and the use of simpler more straight forward programming techniques.

The embodiments described above and shown in the attached drawings have been given by way of illustration only and numerous other embodiments of the subject invention will be readily apparent to those skilled in the art. For example, the use of static RAM's or other forms of memory in the modules of the subject invention would be well within their skill. Thus, limitations on the subject invention are to be found only in the claims set forth below.

What is claimed is:

1. A memory module comprising;
  (a) a postal rate memory storing postal rate information for use in a postal scale having a processor for computing appropriate postage for items to be mailed;
  (b) a battery having sufficient capacity to provide at least a substantial portion of the power requirements of such scale until said memory is replaced with an updated postal rate memory;
  (c) first means for connecting said battery to said memory to provide power to said memory; and,
  (d) second means for connecting said memory to said processor so that such processor may access said postal rate information to compute said appropriate postage.

2. A module as described in claim 1 wherein said memory comprises non-volatile memory.

3. A module as described in claim 1 wherein said memory is volatile memory and said battery supplies power to said memory to maintain said data.

4. A module as described in claim 3 wherein said memory is dynamic random access memory and said module further comprises refresh circuitry connected to said memory and powered by said battery.

5. A module as described in claim 1 further comprising third means for connecting said battery to the power distributions system of said scale.

6. A module as described in claim 5 wherein said memory comprises non-volatile memory.

7. A module as described in claim 5 wherein said first means connects said battery to said memory through said power distribution system only when said third means connects said battery to said distribution system.

8. A module as described in claim 7 wherein said memory comprises non-volatile memory.

9. A module as described in claim 5 wherein said memory is volatile memory and said battery supplies power to said memory to maintain said data.

10. A module as described in claim 9 wherein said memory is dynamic random access memory and said module further comprises refresh circuitry connected to said memory and powered by said battery.

11. A postal scale comprising:
  (a) a scale for determining the weight of an item to be mailed;
  (b) a data entry means for entering postal information relating to said item;
  (c) means for outputting a postage value for said item;
  (d) a memory module for storing postal rate information;
  (e) a processor connected to said scale, said entry means, said output means and said memory module, said processor computing said appropriate postage value for said item in accordance with said weight, said entered postal information relating to said item and said postal rate information and outputting said postage valve through said output means; and,
  (f) wherein said memory module further comprises;
    (f.1) a postal rate memory storing said postal rate information;
    (f.2) a battery having sufficient capacity to provide at least a substantial portion of the power requirements of said postal scale until said memory is replaced with an updated postal rate memory;
    (f.3) first means for connecting said battery to said memory to provide power to said memory; and,
    (f.4) second means for connecting said memory to said processor so that that processor may access said postal rate information.

12. A postal scale as described in claim 11 wherein said memory comprieses non-volatile memory.

13. A postal scale as described in claim 11 wherein said memory module further comprises third means for connecting said battery to the power distribution system of said postal scale.

14. A postal scale as described in claim 13 wherein said first means connects said battery to said memory through said power distribution system only when said third means connects said battery to said distribution system.

15. A postal scale as described in claim 11 wherein said memory is volatile memory and said battery supplies power to said memory to maintain said postal rate information.

16. A postal scale as described in claim 15 wherein said module further comprises refresh circuitry connected to said memory and powered by said battery.

17. A method of computing the appropriate postage for items to be mailed comprising the steps of:

(a) providing a postal scale for weighing said items and for determining the appropriate postage values for said items in accordance with the weight of said items and selected postal rate information, said scale including a battery powered memory module for storing said postal rate information and for providing at least a substantial portion of the power requirements of said scale;

(b) monitoring postal rates for changes in said selected postal rate information and upon a change in said selected postal rate information replacing said battery powered memory module with a new, charged memory module storing updated postal rate information; and, (c) monitoring the time elapsed after said scale is provided or said memory module is replaced and, if a predetermined time elapses, replacing said memory module with a new, charged memory module so that the battery in use does not run down.

* * * * *

UNITED STATES PATENT AND TRADEMARK OFFICE
CERTIFICATE OF CORRECTION

PATENT NO. : 4,628,457
DATED : December 9, 1986
INVENTOR(S) : Flavio M. Manduley It is certified that error appears in the above—identified patent and that said Letters Patent is hereby corrected as shown below:

Col. 6, line 7:  the word "said" second occurrence should be --such--.

Signed and Sealed this

Second Day of May, 1989

Attest:

DONALD J. QUIGG

*Attesting Officer*    *Commissioner of Patents and Trademarks*